(12) United States Patent
Svirsky et al.

(10) Patent No.: US 11,352,148 B2
(45) Date of Patent: Jun. 7, 2022

(54) GROUND SUPPORT STATION FOR AERIAL VEHICLES

(71) Applicant: COPTERPIX PRO LTD., Kibbutz Karmia (IL)

(72) Inventors: Alon Svirsky, Even Yehuda (IL); Eli Sayag, Sderot (IL); Ron Dalva, Kibbutz Zikim (IL); Nitay Morag, Nahal Oz (IL)

(*) Notice: Subject to any disclaimer, the term of this patent is extended or adjusted under 35 U.S.C. 154(b) by 384 days.

(21) Appl. No.: 16/737,932

(22) Filed: Jan. 9, 2020

(65) Prior Publication Data

US 2021/0070468 A1   Mar. 11, 2021

Related U.S. Application Data

(60) Provisional application No. 62/896,038, filed on Sep. 5, 2019.

(51) Int. Cl.
*B64F 1/00* (2006.01)
*B64F 1/22* (2006.01)
*B64C 39/02* (2006.01)

(52) U.S. Cl.
CPC .............. *B64F 1/007* (2013.01); *B64F 1/222* (2013.01); *B64C 39/024* (2013.01); *B64C 2201/042* (2013.01); *B64C 2201/146* (2013.01); *B64C 2201/18* (2013.01); *B64C 2201/201* (2013.01)

(58) Field of Classification Search
CPC ......... B64C 2201/201; B64C 2201/208; B64F 1/222; B64F 1/007
See application file for complete search history.

(56) References Cited

U.S. PATENT DOCUMENTS

| | | | |
|---|---|---|---|
| 9,977,435 B2* | 5/2018 | Fisher | G08G 5/0034 |
| 10,453,348 B2* | 10/2019 | Speasl | G06Q 10/08 |
| 10,974,849 B2* | 4/2021 | Kim | B64F 1/222 |
| 11,168,487 B2* | 11/2021 | Wankewycz | B64C 39/024 |
| 2019/0308724 A1* | 10/2019 | Cooper | B64C 39/024 |
| 2020/0207485 A1* | 7/2020 | Foggia | B64F 1/32 |
| 2021/0148131 A1* | 5/2021 | Wankewycz | H02J 7/00 |
| 2021/0276735 A1* | 9/2021 | Raptopoulos | G08G 5/0082 |
| 2022/0019247 A1* | 1/2022 | Dayan | B64F 1/362 |

* cited by examiner

*Primary Examiner* — Brian M O'Hara
(74) *Attorney, Agent, or Firm* — Alphapatent Associates, Ltd; Daniel J. Swirsky

(57) ABSTRACT

A ground station for aerial vehicles including a protective casing; at least one charging mechanism; and an extendable landing pad. The extended landing pad is operable to transition between a closed configuration having dimensions suitable to be contained within said protective casing, and an open configuration having dimensions suitable to land the aerial vehicle.

15 Claims, 7 Drawing Sheets

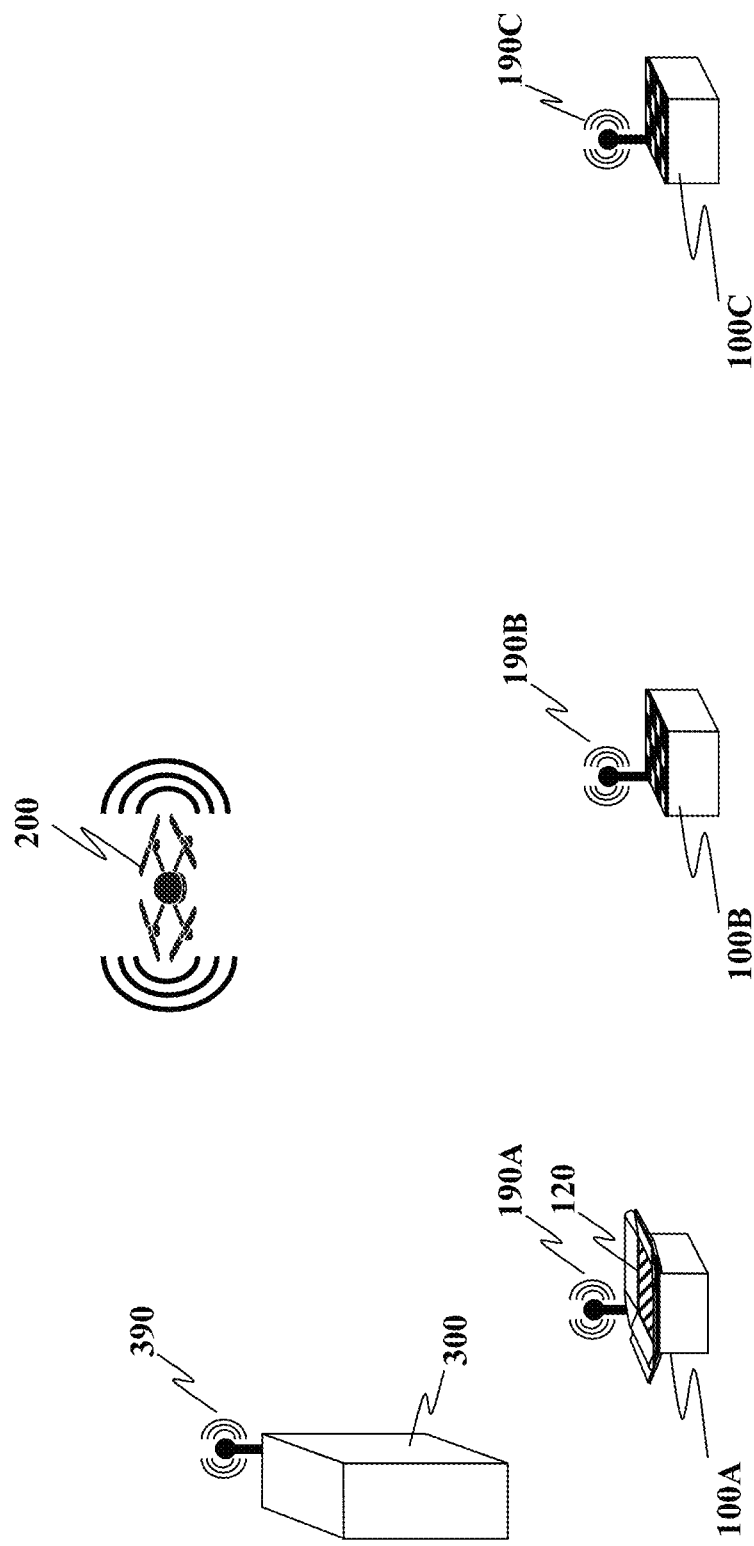

GROUND SUPPORT STATION FOR AERIAL VEHICLES

BACKGROUND

The disclosure herein relates to systems and methods for providing ground support to vertical takeoff aerial vehicles. In particular ground stations providing landing pads, charging stations and protective casings for aerial vehicles may extend their operational range.

SUMMARY

There is a need for a mobile ground station for aerial vehicles which may provide landing pads and charging functionality for aerial vehicles such as multicoptors, rockets propelled vehicles or the like. The current disclosure addresses this need.

According to one example, the ground station includes a protective casing; at least one charging mechanism; and an extendable landing pad. The extended landing pad may be operable to transition between: a closed configuration having dimensions suitable to be contained within said protective casing, and an open configuration having dimensions suitable to land the aerial vehicle.

Optionally, the ground station includes a base platform for supporting the aerial vehicle within said protective casing. Accordingly, the ground station may include an elevator mechanism operable to raise or lower said base platform. Optionally, the elevator mechanism comprises a manual actuator and transmission mechanism.

Optionally, the ground station includes a centering mechanism configured to direct an aerial vehicle onto said base platform from anywhere upon said landing pad.

Optionally, the charging mechanism comprises a power supply operable to maintain a potential difference between a first conducting terminal and a second conducting terminal. Variously, the first conducting terminal comprises at least one conducting element embedded in a base platform and configured to conductively couple with a corresponding conducting element of an aerial vehicle placed thereupon. The second conducting terminal may also comprise at least a second conducting element embedded in the base platform and configured to conductively couple with a corresponding second conducting element of an aerial vehicle placed thereupon.

Additionally or alternatively, at least one of said first conducting terminal and said second conducting terminal comprises at least one conducting element embedded in an upper closing of the protective casing and configured to conductively couple with a corresponding conducting element of an aerial vehicle housed within the protective case.

Variously, the power supply is selected from a group consisting of solar panels, wind turbines, fuel cells, electrochemical cells, piezoelectric units and combinations thereof. Where the power supply comprises photovoltaic panels, these may be situated on an outer surface of said protective casing particularly on the closing of said protective casing.

Where appropriate, the protective casing comprises a bottom-panel, four side-panels and a top-closing. The top-closing may comprise a first outwardly folding flap rotatably coupled along a common edge with a first side-panel, and a second outwardly folding flap rotatably coupled along a common edge with a second side-panel opposite to said first side-panel. Optionally, protective casing is transparent to satellite navigation signals. Optionally, the ground station includes a locking mechanism to secure contents of the protective casing when closed.

In some examples the extendable landing pad includes: a base platform configured to be elevated from within said protective casing to a raised position such that an aerial vehicle placed thereupon is no longer contained by the protective casing; at least one flap configured to unfold from the top of the protective casing. Optionally, the extendable landing pad includes a rectangular base platform, four side flaps configured to fold out of the protective casing thereby providing extensions to each edge of the rectangular base platform, and four lobes configured to fold out of the protective casing and to bridge gaps between said side extensions. Alternatively, the protective casing has three side-panels and a top-closing.

Optionally, extensions are configured to retract within the protective casing when said base platform is at the recessed level. For example, each side flap is rotatably coupled to an edge of said base platform. The side flap may have a length selected such that when the base platform is at the recessed level, the side flap folds up against one said side-panel of the protective case fitting under the top-closing.

Alternatively or additionally, the extension comprises at least one wing operable to extend telescopically from an edge of the base platform. Bridging lobes may be configured to fold out of the protective casing and to fill gaps between said side extensions.

Optionally, the ground station includes a homing aid configured to guide the aerial vehicle towards the extendable landing pad. By way of example, the homing aid may include regions of contrasting physical properties readily identifiable from above, such as contrasting thermal absorption properties, thermal emission properties, thermal conductivity, electrical conductivity, reflectivity, specific heat capacity, refractive index and the like or combinations thereof.

Where the visual indication is a pattern of contrasting dark areas and light areas readily identifiable from above, at least one said dark areas may comprises a functional element such as a conducting terminal of a charging mechanism, a photovoltaic cell, an antenna or the like.

In some examples, the homing aid comprises a first visual indication upon an outer surface of a top-closing, the first visual indication comprising a first pattern of contrasting dark and light areas readily identifiable from high altitude and configured to guide the aerial vehicle towards the ground station; and a second visual indication upon the extendable landing pad, the second visual indication comprising a second pattern of contrasting dark and light areas configured to be identifiable from low altitude and configured to guide the aerial vehicle towards a desired point upon the extendable landing pad.

Additionally or alternatively, the homing aid comprises a beacon selected from an IR beacon, an RF beacon, a LED beacon, a visual beacon, an audio beacon, a US beacon and combinations thereof.

Optionally, the ground station includes a windbreaker configured to reduce crosswinds across the extendable landing pad.

In some embodiments a system may be allow the functionality of the ground station to be extended by adding additional modules which may be thereto via mechanical coupling mechanisms. Additionally or alternatively, modules may be coupled electronically via inductive or conductive connections for example.

For example, the ground station system may include a weather station which may be a module configured and operable to detect local weather conditions. Other additional functionality may be provided via a transportation module, for example including wheels, a vehicle mounting module for coupling said protective casing to a vehicle when in transit, a protective casing configured to protect the contents thereof from oscillations during motion, a suspension module configured to protect the contents thereof from oscillations during motion or the like.

Where required, the ground station may include a carrying module, for example selected from a group consisting of carrying straps, handles, back pack modules, harnesses, hooks, clips, vehicle mounting units and combinations thereof.

Other extension modules may be selected from the group consisting of battery pack modules, communication modules, sensor modules, weather station modules, radar modules, night vision modules and the like as well as combinations thereof.

Another aspect of the disclosure is to teach a method for extending range of aerial vehicles by providing at least one aerial vehicle, providing at least one ground station such as described herein which is configured and operable to provide protective casing, landing pads and charging functionality for the aerial vehicle, and deploying the ground stations over the required range.

Another aspect of the disclosure is to teach a method for providing a landing pad for aerial vehicles by deploying a ground station such as described herein, triggering the ground station to raise a base platform forming landing pad for the aerial vehicle; the ground station raising the base platform and extending a landing pad from a protective case, the aerial vehicle identifying and landing on the landing pad, a centering mechanism directing the aerial vehicle onto the base platform, the ground station retracting the landing pad and the aerial vehicle into the protective case, and the ground station charging the aerial vehicle.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIG. 1A is a schematic representation of an example of a system for providing ground support to an aerial vehicle;

DETAILED DESCRIPTION

Figure 1B:
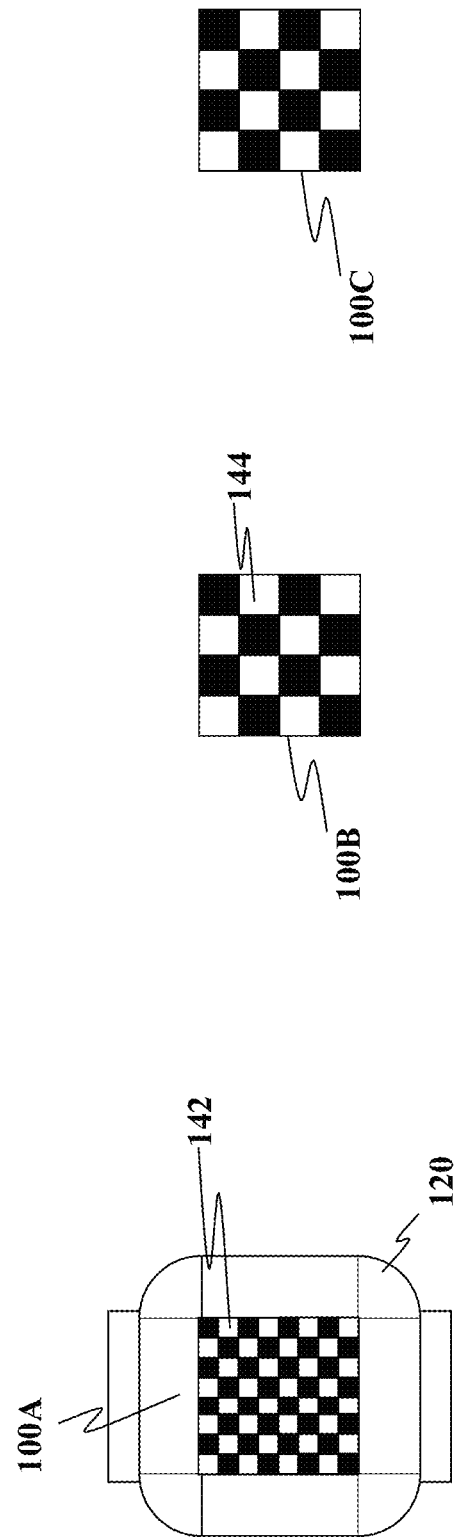
FIG. 1B represents an aerial view of the ground stations represented in FIG. 1A.

Aspects of the present disclosure relate to systems and methods for providing ground support to vertical takeoff aerial vehicles such as a hovercopter, a quadcoptor, a rocket propelled vehicle, a multirotor drone or the like. The system includes portable ground stations including extendable landing pads providing platforms for vertical takeoff and landing of an aerial vehicle.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

Reference is now made to FIG. 1A is a schematic representation of an example of a system for providing ground support to an aerial vehicle 200. The system includes an aerial vehicle 200 supported by a control server 300 and three portable ground stations 100A, 100B and 100C.

Each ground station 100 may be a self contained unit including an extendable landing pad 120 which, when open, may provide a platform for vertical takeoff and landing of an aerial vehicle such as a hovercopter, a quadcoptor, a rocket propelled vehicle, a multirotor drone or the like.

It is a particular feature of the ground station 100 that the extendable landing pad 120 is enabled to transition between at least two configurations, and open configuration and a closed configuration.

In the open configuration, as shown in the first ground station 100A, the landing pad extends beyond the borders of the casing of the ground station 100A such that the dimensions of its area are sufficient to allow the aerial vehicle 200 to land.

In the closed configuration, as shown in the other ground stations 100B, 100B, the landing pad is retracted such that it is contained within the protective casing of the ground station 100.

It is a further feature of the ground station 100 that a landed aerial vehicle may be withdrawn into the protective casing along with the retracting landing pad 120. Once within the ground station 100, a charging mechanism may be used to charge the onboard battery of the aerial vehicle.

Accordingly, by deploying multiple ground stations, the operating range of the aerial vehicle maybe increased as required.

It is further noted that multiple ground stations may support multiple aerial vehicles or a single ground station may support multiple aerial vehicles as required.

For example, a ground station containing an aerial vehicle, may open to allow the first aerial vehicle to take off and a second aerial vehicle to land before closing to charging the second aerial vehicle. In this way, continual operation of at least one aerial vehicle may be supported with potentially no down time.

It will be appreciated that where multiple ground stations are used, a network of aerial vehicles may similarly supported.

The control server 300 may be operable to coordinate the network of ground stations 100 and aerial vehicles 200. Accordingly, communication units 190A-C, 390, such as radio transmitters and receivers or wired communication lines, for example, may be provided on the controller as well as each ground station and each aerial vehicle to enable a communication channel between the control server 300 and each of these networked units as well as between the networked units themselves.

Referring now to FIG. 1B representing an aerial view of the ground stations represented in FIG. 1A, the ground units may include homing aids 142, 140 for guiding the aerial vehicle 200 towards the landing pad 120.

Various homing aids maybe used with the ground stations, such as a beacon or a visual indication.

Beacons may include, for example, infrared beacon signals, radio frequency beacon signals, visible light beacons LED beacon, a visual beacon, an audio beacon, an audio beacon, ultrasonic signal beacon or the like as well as combinations thereof Additionally or alternatively, visual indications may be provided such as a pattern of contrasting dark and light areas readily identifiable from above.

In some systems, the aerial vehicle may be an autonomous vehicle having a payload including only a power pack and a camera. For example, in order to reduce load carried by the aerial vehicle it may be necessary for the aerial vehicle to operate without any on board communication units.

Accordingly, the camera maybe used as the homing aid detection mechanism. To this end a first visual indication 144 may be provided on the outer surface of a closed ground station, for example on the closable lid or top-closing. The first visual indication may include a first pattern of contrasting dark and light areas readily identifiable by the aerial vehicle from high altitude such that the aerial vehicle may be guided towards the ground station.

A second visual indication 142 may be revealed when the ground station is opened and the landing pad 120 is extended. The second visual indication may include a second pattern of contrasting dark and light areas configured to be identifiable from lower altitude and configured to guide the aerial vehicle towards the center or other desired point upon the extendable landing pad 120.

Figure 2A:
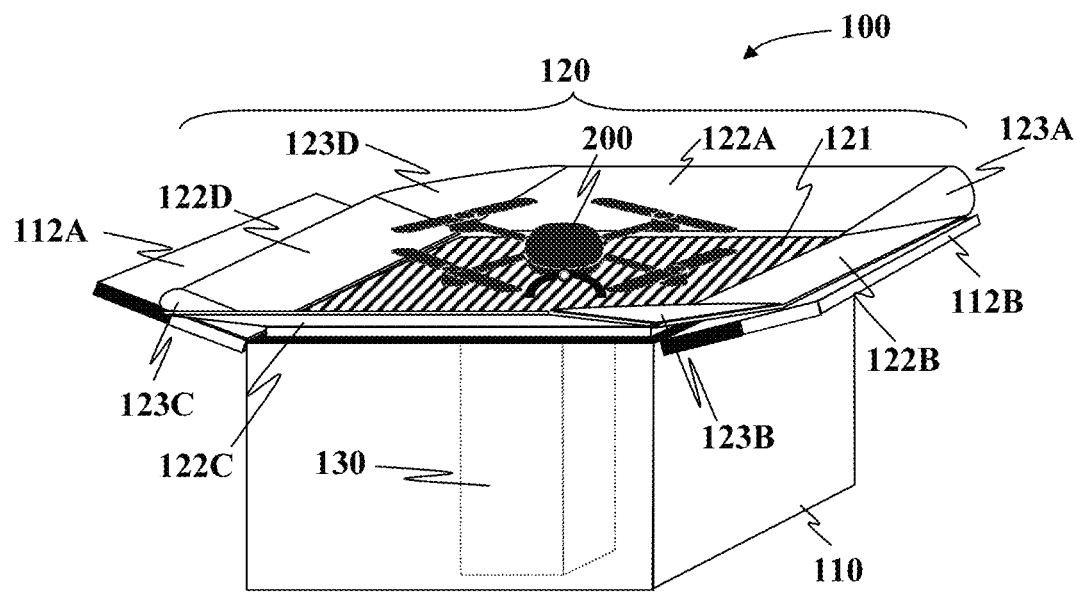
FIGS. 2A and 2B are schematically represent an isometric projection and a top view of an example of a ground station for an aerial vehicle in its open configuration.
Figure 2B:
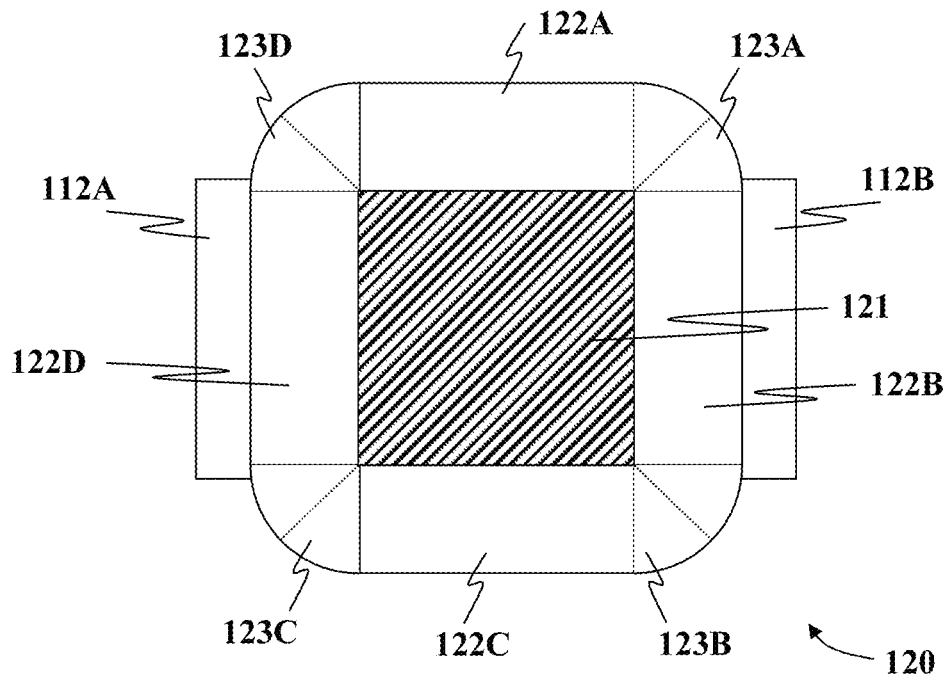

Reference is now made to FIGS. 2A and 2B which schematically represent example of a ground station for an aerial vehicle in its open configuration. FIG. 2A represents an isometric view and FIG. 2B represents a top view.

The ground station 100 includes an extendable landing pad 120 having a base platform 121, side extensions 122A-D and bridging lobes 123A-D.

The base platform 121 which may provide a platform for supporting and aerial vehicle 200, may be raised from within a protective casing 110. Accordingly, an elevator mechanism 130 may be provided to raise and lower the base platform.

When the base platform 121 is in the raised configuration an aerial vehicle 200 placed thereupon is no longer contained by the protective casing and has clear lines for takeoff at almost any angle. The side extensions 122A-D are configured to extend the area of the landing pad. The bridging lobes 123A-D are provided to fill the corner gaps formed between the open side extensions. The side extensions 122A-D and the bridging lobes 123A-D are all preferably configured to retract, perhaps by folding up such that they fit into the casing when closed.

For example, the side extensions may be variously configured to unfold from the base platform 121 or from the top of the protective casing 110 as required.

Typically, the base platform 121 is rectangular and four side flaps are rotatably coupled to each edge of the base platform and configured to fold out of the protective casing. Alternatively, other shaped base platforms and side extensions may be preferred such as the triangular example shown in FIGS. 6A-B, still other shapes and configurations will occur to those skilled in the art. For example, is still other embodiments, the side extensions may include wings operable to extend telescopically from an edge of the base platform or the top-closing as required.

Figure 3A:
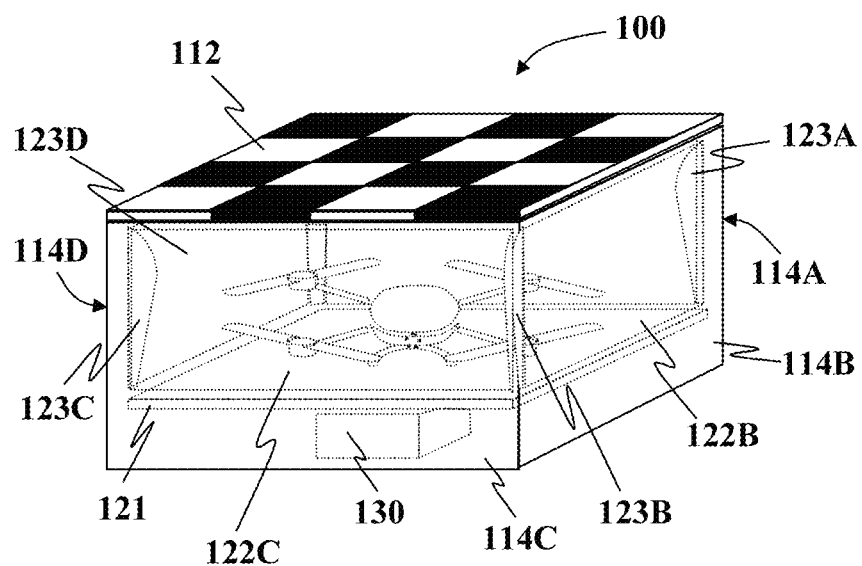
FIGS. 3A and 3B are schematically represent an isometric projection and a cross sectional view of the example of the ground station for an aerial vehicle in its closed configuration.
Figure 3B:
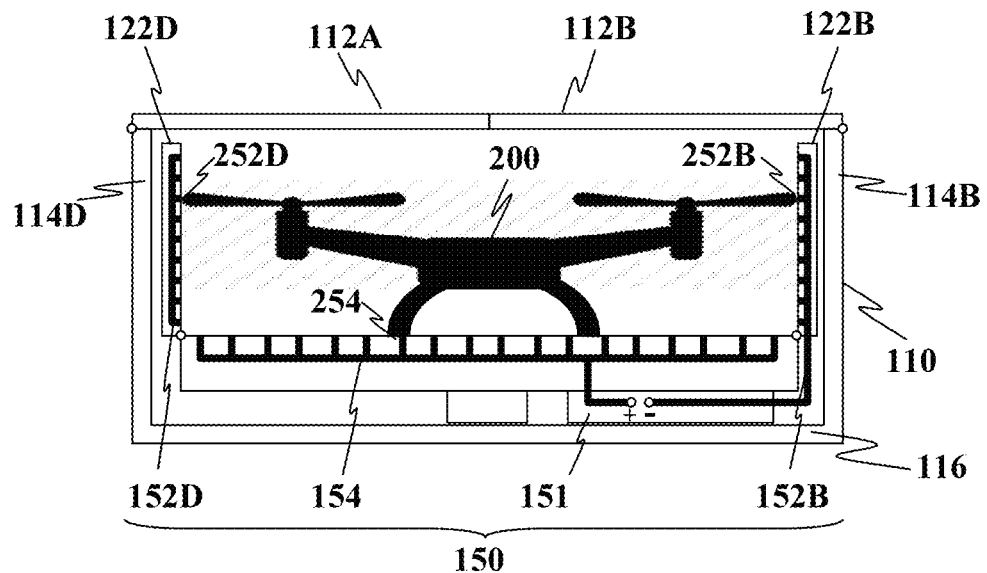

Referring now to FIGS. 3A and 3B which schematically represent an isometric projection FIG. 3A and a cross sectional view FIG. 3B of the example of the ground station 100 in its closed configuration.

The base platform 121 has been lowered by the elevator mechanism 130 into a recessed configuration such that the side extensions 122A-D, bridging lobes 123A-D and supported aerial vehicle 200 are all contained within the protective casing 110.

The protective casing 110 includes a bottom-panel 116, four side-panels 112A-D and a top-closing 112. The top-closing 112 comprises a first outwardly folding flap 112A rotatably coupled along a common edge with a first side-panel 112D, and a second outwardly folding flap 112B rotatably coupled along a common edge with a second side-panel 112B opposite to said first side-panel.

Where required, the side-panels may serve as windbreakers configured to reduce crosswinds across the extendable landing pad during takeoff or landing.

It is noted that with the base platform in the recessed configuration, the side extensions 122A-D and the bridging lobes 123A-D are all folded into the casing and contained therewithin.

The protective casing 110 is preferably constructed from a material transparent to radio signals such that an aerial vehicle contained within may receive satellite navigation signals or the like. Accordingly, in some embodiments non conducting materials are used to form the casing in order to avoid the construction of a Faraday cage which would block any electromagnetic radiation from penetrating.

Referring particularly to FIG. 3B, a possible charging mechanism 150 is shown for charging the contained aerial vehicle 200. A power supply 151 such as an electrochemical cell or battery, a fuel cell or the like, is operable to maintain a potential difference between a first conducting terminal 152B, 152D and a second conducting terminal 154. One conducting terminal may serve as a charging anode and the second conducting terminal may serve as the charging cathode.

For illustrative purposes only, in some embodiments, the first conducting terminal 154 may comprises conducting elements embedded in the base platform 141, perhaps in strips, such that they conductively couple with a corresponding conducting element 254 in the foot of the aerial vehicle placed thereupon. The second conducting element 152B, 152D may be embedded in a side flap 122B, 122D of the landing pad, such that when folded up it may conductively couple with a corresponding conducting element 252B, 252D on a propeller tip of the aerial vehicle 200 housed within the protective case.

In other embodiments, conducting elements may be incorporated into other sections as required, for example, within the walls of the protective casing or the upper closing such that they conductively connect with other parts of the aerial vehicle.

Optionally the ground station 100 may include power generators such as photovoltaic panels, wind turbines or the like which may be used to charge its integrated power supply. Alternatively or additionally, the ground station may be connected to the power mains. Where Required, the photovoltaic panels may be integrated into the top closing of the protective casing for example as part of the visual indication of a homing aid.

Referring now to FIGS. 4A-E, showing a series of cross sections indicating how the example of the ground station 100 may transition between an open and a closed configuration.

Figure 4E:
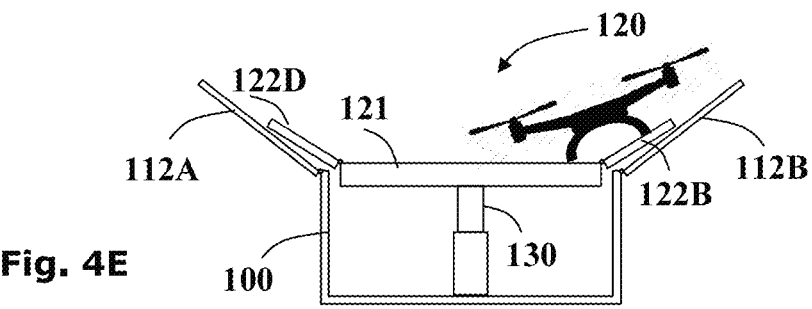
FIGS. 4A-E are a series of cross sections indicating how the example of the ground station may transition between an open and a closed configuration.
Figure 4D:
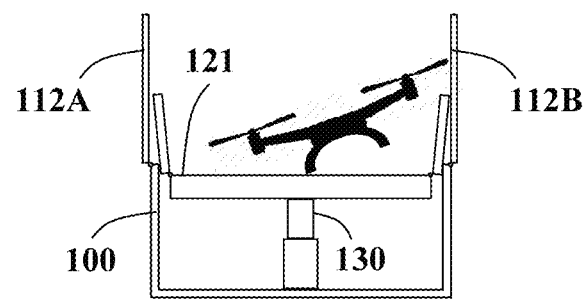
Figure 4C:
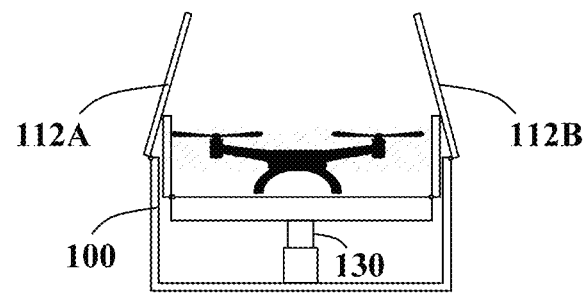
Figure 4B:
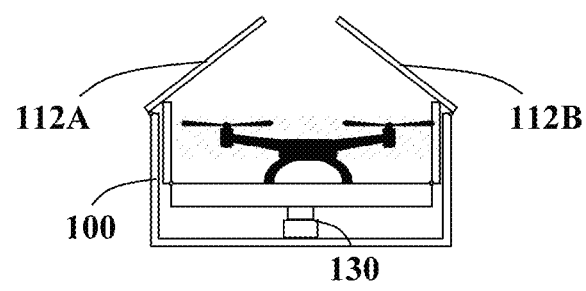
Figure 4A:
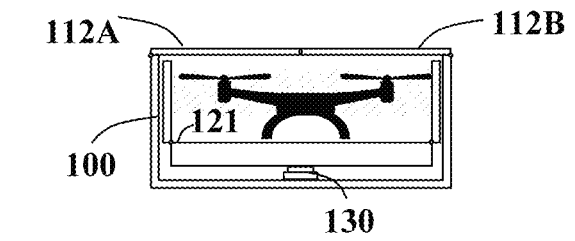

In the base platform 120 is in its recessed configuration as shown in FIG. 4A, the side flaps are folded upwards such that they run along the side walls and are contained within container below the top closing 112A, 112B.

The elevating mechanism 130 may drive the base platform such that it is raised or lowered as required. When raised the side extensions may urge open the top closing and the side flaps fold out.

It is further noted that an aerial vehicle landing off center of the landing pad as shown in FIG. 4E, may be forced back into a center position by the closing side flaps such that it is centered onto the base platform 121. Other centering mechanisms such as articulated side arms or the like, will occur to those skilled in the art.

Figures 5A, 5B, 5C:
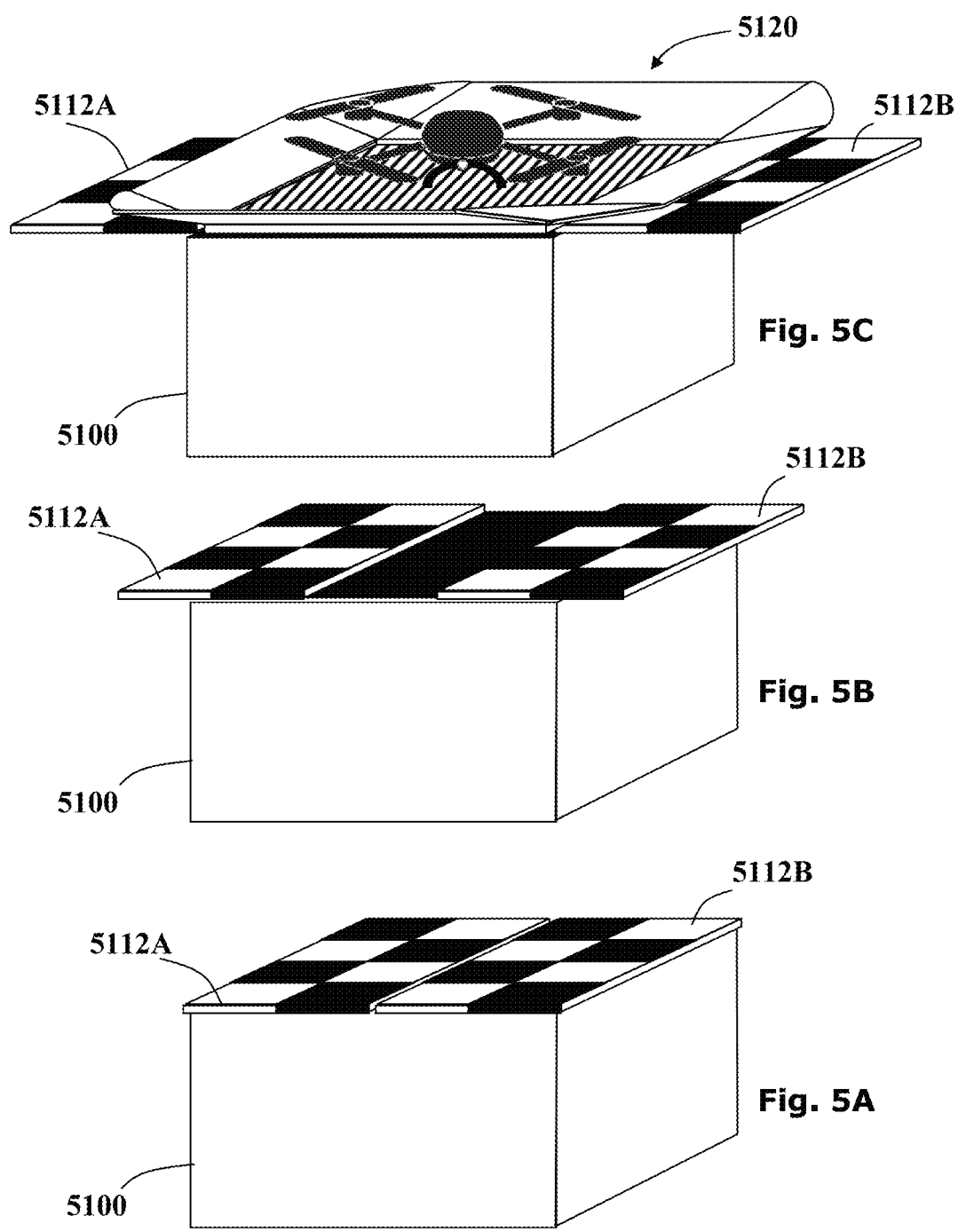
FIGS. 5A-C are a series of isometric projections indicating how another example of the ground station may transition between an open and a closed configuration.

Referring now to FIGS. 5A-C showing a series of isometric projections indicating how another example of the ground station may transition between an open and a closed configuration by sliding two side doors 5112A, 5112B of the top-closing such that the landing pad 5120 may be raised.

Figure 6B:
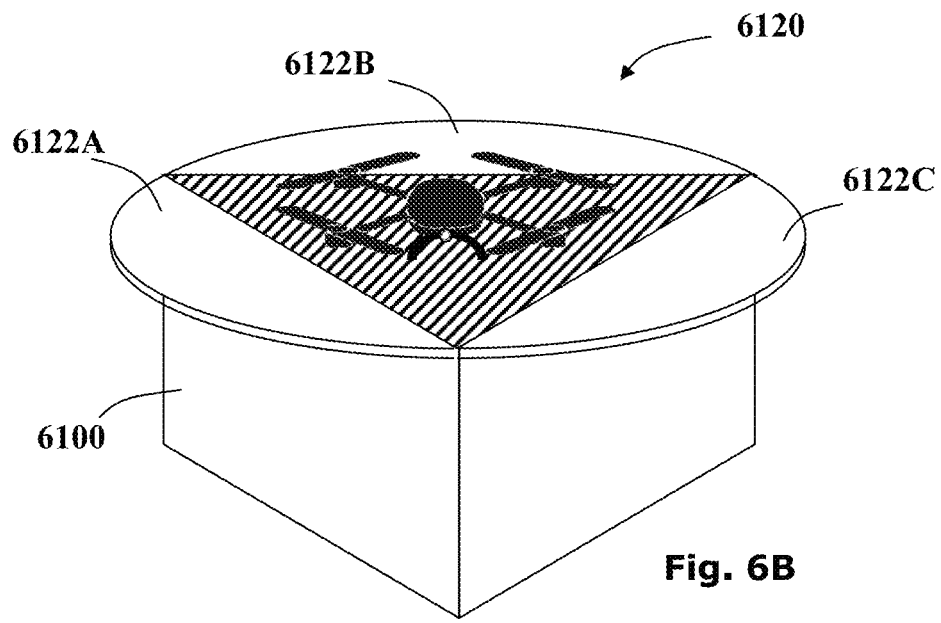
FIGS. 6A and 6B show the closed configuration and the open configuration of still another example of the ground station.
Figure 6A:
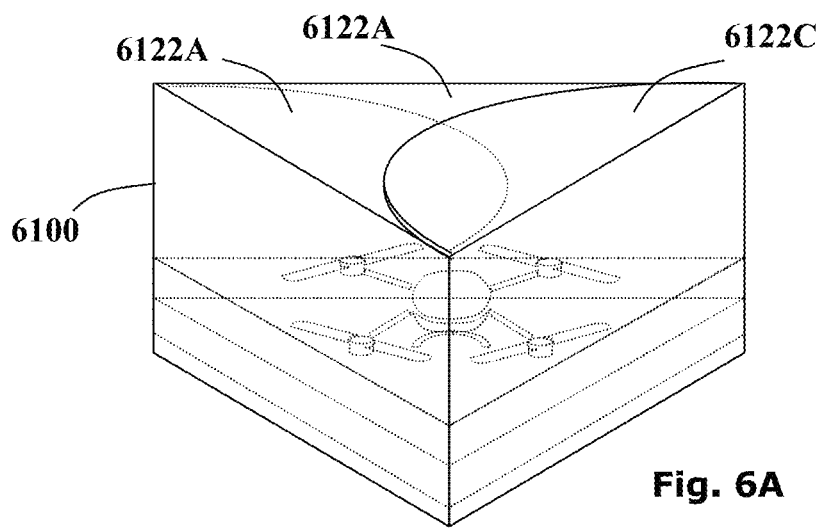

Referring now to FIGS. 6A and 6B, still another embodiment is shown in which a triangular ground station 6120 is presented in which the top closing is formed from three side panels 6122A-C which unfold to both open the container as well as to form the extended landing pad 6120.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like intended to include all such new technologies a priori.

As used herein the term "about" refers to at least ±10%. The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6, should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A ground station for an aerial vehicle, the ground station comprising:
   a protective casing;
   at least one charging mechanism; and
   an extendable landing pad operable to transition between
      a closed configuration having dimensions suitable to be contained within said protective casing, and
      an open configuration having dimensions suitable to land the aerial vehicle; the extendable landing pad including:
         a base platform for supporting the aerial vehicle within said protective casing;
         an elevator mechanism operable to raise or lower said base platform;
         a centering mechanism configured to direct an aerial vehicle onto said base platform from anywhere upon said landing pad;
         side flaps configured to fold out of the protective casing thereby providing side extensions to the base platform; and
         lobes configured to fold out of the protective casing and to bridge gaps between said side extensions.

2. The ground station of claim 1 wherein said charging mechanism comprises a power supply operable to maintain a potential difference between a first conducting terminal and a second conducting terminal.

3. The ground station of claim 2 wherein said power supply is selected from a group consisting of solar panels, wind turbines, fuel cells, electrochemical cells, piezoelectric units and combinations thereof.

4. The ground station of claim 1 wherein said protective casing comprises a top-closing including a first outwardly folding flap rotatably coupled along a common edge with a first side-panel, and a second outwardly folding flap rotatably coupled along a common edge with a second side-panel opposite to said first side-panel.

5. The ground station of claim 1 wherein said extendable landing pad comprises:
   the base platform having a rectangular shape and configured to be elevated from within said protective casing to a raised position such that an aerial vehicle placed thereupon is no longer contained by the protective casing.

6. The ground station of claim 5 wherein said side flaps and lobes each include a set of four corresponding to sides of the rectangular base platform.

7. The ground station of claim 1 further comprising a homing aid configured to guide the aerial vehicle towards the extendable landing pad.

8. The ground station of claim 7 wherein the homing aid comprises at least one visual indication including a pattern of contrasting dark areas and light areas readily identifiable from above.

9. The ground station of claim 7 wherein the homing aid comprises
   a first visual indication upon an outer surface of a top-closing, the first visual indication including a first pattern of contrasting dark and light areas readily identifiable from high altitude and configured to guide the aerial vehicle towards the ground station; and
   a second visual indication upon the extendable landing pad, the second visual indication including a second pattern of contrasting dark and light areas configured to be identifiable from low altitude and configured to guide the aerial vehicle towards a desired point upon the extendable landing pad.

10. The ground station of claim 7 wherein the homing aid comprises a beacon selected from an IR beacon, an RF beacon, a LED beacon, a visual beacon, an audio beacon, a US beacon and combinations thereof.

11. The ground station of claim 1 comprising at least one extension module selected from the group consisting of transportation modules, carrying modules; battery pack modules, communication modules, sensor modules, weather station modules, radar modules, night vision modules carrying straps, handles, back pack modules, harnesses, hooks, clips, vehicle mounting units and combinations thereof.

12. The ground station of claim 1 wherein said protective casing is configured to protect the contents thereof from oscillations during motion.

13. The ground station of claim 1 further comprising a suspension module configured to protect the contents thereof from oscillations during motion.

14. The ground station of claim 1 further comprising a locking mechanism to secure contents of the protective casing when closed.

15. The ground station of claim 1 wherein said elevator mechanism comprises a manual actuator.

* * * * *